Patented June 6, 1939

2,160,840

UNITED STATES PATENT OFFICE 2,160,840

THERMAL DEHYDRATION OF ALIPHATIC ACIDS

Henry Dreyfus, London, England

No Drawing. Application July 7, 1937, Serial No. 152,379. In Great Britain July 17, 1936

11 Claims. (Cl. 260—547)

This invention relates to improvements in the thermal dehydration of aliphatic acids, and is more particularly concerned with the manufacture of acetic anhydride or ketene by the thermal dehydration of acetic acid.

The general method of manufacturing acetic anhydride or ketene directly from acetic acid is to subject the acetic acid to thermal decomposition or dehydration, usually in the presence of suitable catalysts. While dehydration takes place over a wide range of temperature, the most useful range is generally 500–1000° C. and especially 600–900° C., though of course the optimum temperature naturally depends upon the particular conditions employed and notably the particular catalyst and the pressure or partial pressure of the acetic acid. In my U. S. Patent No. 1,735,962 I have described catalysing the reaction by means of a phosphoric acid and have further indicated that the process may be carried out under reduced pressure or at ordinary pressure. Further in my U. S. Patent No. 1,883,353 I have shown the advantages of carrying out the process in the presence of bases, and in particular ammonia and the organic bases which are substitution products of ammonia, for example pyridine, piperidine, aniline, alkyl anilines, toluidines and the like. Again in this patent it is indicated that while the reaction may be carried out at pressures higher than atmospheric, it is preferable to employ atmospheric pressure or reduced pressure.

I have now found that this reaction may very advantageously be catalysed by means of basic compounds of phosphorus. In particular I may employ phosphines, tetraphosphinium bases or salts thereof, and triphosphine oxides. The general formulae of the compounds in each of these three classes comprise the grouping

where $R_1$, $R_2$ and $R_3$ represent hydrogen or organic radicles for example, aliphatic aromatic or hydro-aromatic radicles. In the case of the phosphines these compounds contain no other groupings at all, the phosphorus being trivalent so that the formula above given is in fact the general formula for this class of compound.

The tetraphosphonium bases contain in their general formula, in addition to the grouping set out above, two other groupings, one a hydroxyl grouping and the other like $R_1$, $R_2$ and $R_3$ being a hydrogen atom or an organic radicle. The general formula for this class of body is therefore

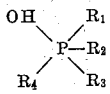

In the triphosphine oxides the phosphorus is pentavalent (as in the tetraphosphonium bases) and the general formula is

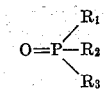

the two valencies not occupied by $R_1$, $R_2$ and $R_3$ being utilised by an oxygen atom. The triphosphine oxides are readily formed by simple oxidation of the phosphines or by thermal decomposition of the tetraphosphonium bases, and are therefore to be preferred.

In any of the above compounds where the R radicles are organic, they may, for example, be methyl, ethyl, phenyl, paratolyl, benzyl, etc.

The catalysts of the invention may, if desired, be used together with nitrogenous bases, including ammonia and the organic nitrogenous bases, as referred to in my earlier U. S. Patent No. 1,883,353. The phosphorus bases may be dissolved in the main bulk of the acetic acid to be subjected to thermal dehydration, or they may be injected into the reaction chamber separately from the acid to be hydrated, or separately from the main bulk of the acid. Most conveniently the acid is vaporised, preheated and fed to the reaction chamber and the catalyst is introduced into the superheated acid vapor in the form of a solution in a solvent which exercises no deleterious effect upon the reaction. Preferably the catalyst is dissolved in a portion of the acetic acid or other acid to be dehydrated but other solvents may be used, for instance there may be used for this purpose a quantity of a liquid which is subsequently to be employed to facilitate the separation of the products of the thermal dehydration, as, for example, by forming an azeotropic mixture with water as referred to below. It is preferred to raise the temperature of the acid vapor by the preheating step to within 20 to 70° C. of the temperature at which the thermal dehydration is to be effected, for instance when employing temperatures of 670 to 720° C. in the reaction zone the preheater may be run at 600 to 650° C. If desired, however, the vapor may only be heated to within say 100° C. of the dehydration temperature or may be heated right up to the dehydration temperature.

The quantity of phosphorus base to be employed may be quite small in relation to the amount of acetic acid or other acid vapor. For example, it may be of the order of 5% of the weight of the acetic acid, but is preferably much less, say less than 1%, quantities of the order of .2 to .5% being quite sufficient. Where a nitrogenous base is employed in conjunction with the phosphorus base, its proportion may be similar to that of the phosphorus base and it may be introduced together with the phosphorus base or separately.

The reaction is best carried out at atmospheric pressure or reduced pressure. As already indicated, the main products of the thermal dehydration of acetic acid are acetic anhydride and ketene. The anhydride or ketene may be recovered from the reaction products in any suitable manner. For example, the reaction products may be cooled so as to condense the whole of the anhydride, water and unchanged acid and the ketene allowed to pass on, or the reaction products may be subjected to a fractionation treatment designed to separate the anhydride from the water and the ketene. In the latter case, it is of advantage to employ liquids such as benzene, toluene, xylene, chlorbenzene, chloroform and the like which form an azeotropic mixture with the water.

The invention is particularly useful in the thermal dehydration of acetic acid to acetic anhydride and/or ketene, but it may also be applied to the thermal dehydration of other aliphatic acids, for example propionic acid, butyric acid and the like.

Having described my invention what I desire to secure by Letters Patent is:

1. Process for the thermal dehydration of an aliphatic acid, which comprises subjecting the vapor of the aliphatic acid to the action of heat in the presence of a compound, the general formula for which comprises the grouping

where $R_1$, $R_2$ and $R_3$ are severally selected from the group consisting of hydrogen, alkyl, aryl and aralkyl radicles.

2. Process for the thermal dehydration of an aliphatic acid, which comprises subjecting the vapor of the aliphatic acid to the action of heat in the presence of a phosphine.

3. Process for the thermal dehydration of an aliphatic acid, which comprises subjecting the vapor of the aliphatic acid to the action of heat in the presence of a tetraphosphonium compound.

4. Process for the thermal dehydration of an aliphatic acid, which comprises subjecting the vapor of the aliphatic acid to the action of heat in the presence of a triphosphine oxide.

5. Process for the thermal dehydration of an aliphatic acid, which comprises vaporising the aliphatic acid, preheating the acid vapor to above its critical temperature and passing the superheated acid vapor into a reaction zone in which the thermal dehydration takes place and introducing into the superheated acid vapor a solution containing a compound whose general formula contains

where $R_1$, $R_2$ and $R_3$ are severally selected from the group consisting of hydrogen, alkyl, aryl and aralkyl radicles.

6. Process for the thermal dehydration of acetic acid, which comprises subjecting acetic acid vapor to the action of heat in the presence of a compound, the general formula for which comprises the grouping

where $R_1$, $R_2$ and $R_3$ are severally selected from the group consisting of hydrogen, alkyl, aryl and aralkyl radicles.

7. Process for the thermal dehydration of acetic acid, which comprises subjecting acetic acid vapor to the action of heat in the presence of a phosphine.

8. Process for the thermal dehydration of acetic acid, which comprises subjecting acetic acid vapor to the action of heat in the presence of a tetraphosphonium compound.

9. Process for the thermal dehydration of acetic acid, which comprises subjecting acetic acid vapor to the action of heat in the presence of a triphosphine oxide.

10. Process for the thermal dehydration of acetic acid, which comprises vaporising the aliphatic acid, preheating the acid vapor to above its critical temperature and passing the superheated acid vapor into a reaction zone in which the thermal dehydration takes place and introducing into the superheated acid vapor a solution containing a compound whose general formula contains

where $R_1$, $R_2$ and $R_3$ are severally selected from the group consisting of hydrogen, alkyl, aryl and aralkyl radicles.

11. Process for the thermal dehydration of acetic acid, which comprises vaporising the aliphatic acid, preheating the acid vapor to above its critical temperature and passing the superheated acid vapor into a reaction zone in which the thermal dehydration takes place and introducing into the superheated acid vapor a solution in acetic acid containing a compound whose general formula contains

where $R_1$, $R_2$ and $R_3$ are severally selected from the group consisting of hydrogen, alkyl, aryl and aralkyl radicles.

HENRY DREYFUS.